Feb. 15, 1938.   H. T. KRAFT   2,108,406
TIRE
Filed June 17, 1935   2 Sheets-Sheet 1

INVENTOR
Herman T. Kraft
BY
Evans & McCoy
ATTORNEYS

Feb. 15, 1938. H. T. KRAFT 2,108,406
TIRE
Filed June 17, 1935 2 Sheets-Sheet 2

INVENTOR
Herman T. Kraft
BY
Evans & McLay
ATTORNEYS

Patented Feb. 15, 1938

2,108,406

UNITED STATES PATENT OFFICE 2,108,406

TIRE

Herman T. Kraft, Akron, Ohio, assignor to The General Tire & Rubber Company, Akron, Ohio, a corporation of Ohio Application June 17, 1935, Serial No. 27,022

8 Claims. (Cl. 152—1)

This invention relates to tires for bicycles, velocipedes, toy wagons and other wheeled devices.

One of the objects of the present invention is to provide a rubber tire of new and improved construction, which can be economically manufactured and easily assembled to a wheel.

Another object is to provide a tire of extruded rubber material which is resilient and capable of absorbing shocks and jars, and yet is stable laterally.

With the above and other objects in view the present invention consists in certain features of construction to be hereinafter described with reference to the accompanying drawings and then claimed.

In the drawings, which illustrate a suitable embodiment of the invention,

Figure 2:
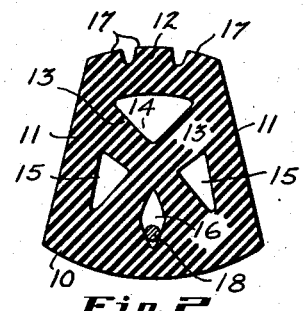
Fig. 2 is an enlarged section taken on line 2—2 of Fig. 1.

Referring to the accompanying drawings, in which like numerals refer to like parts throughout the several views, the tire of the present invention is made of a suitable grade of rubber and is extruded and cut into suitable length. The tire has an arcuate base 10, side walls 11 which converge outwardly from the base 10, and a tread portion 12 uniting the side walls 11 at their outer extremities. Each side wall 11 is connected adjacent the region where it joins with the tread portion 12 with the base 10 adjacent the region where it joins with the opposite side wall 11 by a diagonal narrow web 13. The two webs 13 are integrally joined with each other centrally within the tire as shown in Figure 2, providing a triangularly shaped passageway or cushioning space 14 underlying the tread portion, spaced triangularly shaped side passageways 15 adjacent the side walls 11 and base 10 and a central passageway 16 between the webs 13 and adjacent the base 10.

The tread portion 12 may, if desired, be grooved to provide spaced parallel ribs 17.

Figure 4:
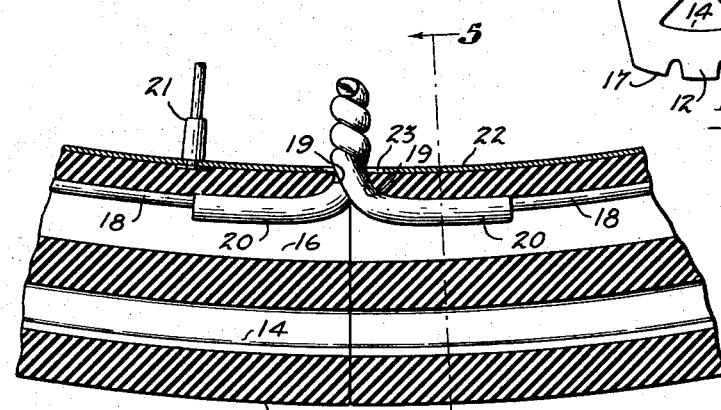
Fig. 4 is an enlarged fragmentary section taken through the tire at its median plane, and showing the same mounted on a wheel.

After the extruded material is cut to the proper length for a wheel on which the tire is to be mounted a clamping wire 18 is threaded through the passageway 16 with the ends projecting beyond the ends of the material. The base portion 10 is slotted at the ends as shown at 19 and the ends of the wire 18 are surrounded by pieces 20 of copper tubing which extend into the passageway 16 a substantial distance as shown in Figure 4. The copper tubing and enclosed ends of the wire are bent radially inwardly through the slots 19 substantially at ninety degree angles.

Figure 1:
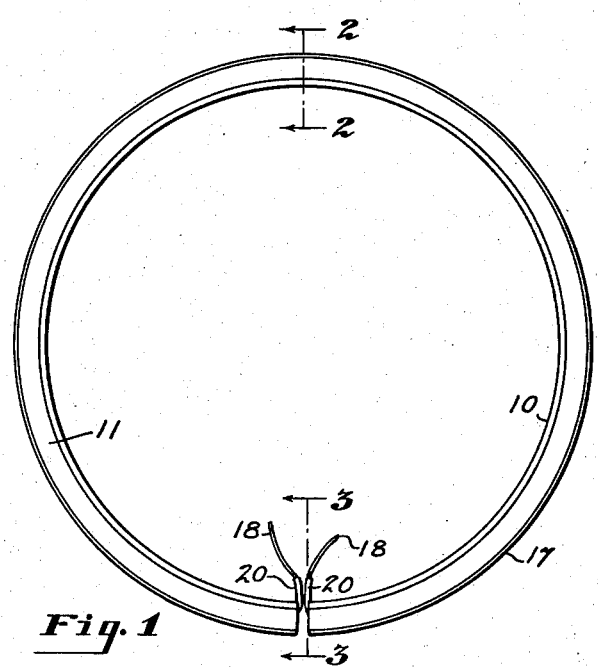
Figure 1 is a side elevation of the tire, showing the same prior to vulcanization.
Figure 3:
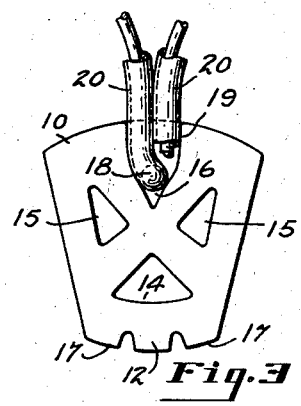
Fig. 3 is an enlarged section taken on line 3—3 of Fig. 1.

The extruded material is then arranged in circular form within a suitable vulcanizing mold, with the two ends in continuous abutting engagement as shown in Figure 1 and with the bent ends of the tubing 20 in substantially the same transverse plane adjacent the base 10, as shown in Figures 3 and 4, and is then vulcanized, producing a continuous tire, the ends of the tire material being vulcanized together.

The wheel 21 on which the tire is to be assembled has a rim 22 having a tire engaging face of arcuate shape and an opening 23 therethrough as shown in Figure 4.

Figure 5:
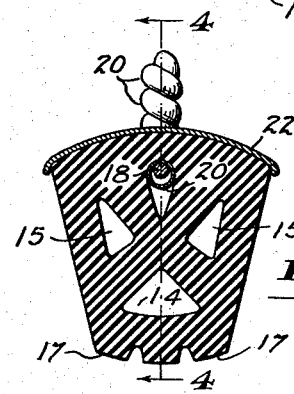
Fig. 5 is a section taken on line 5—5 of Fig. 4.
Figure 6:
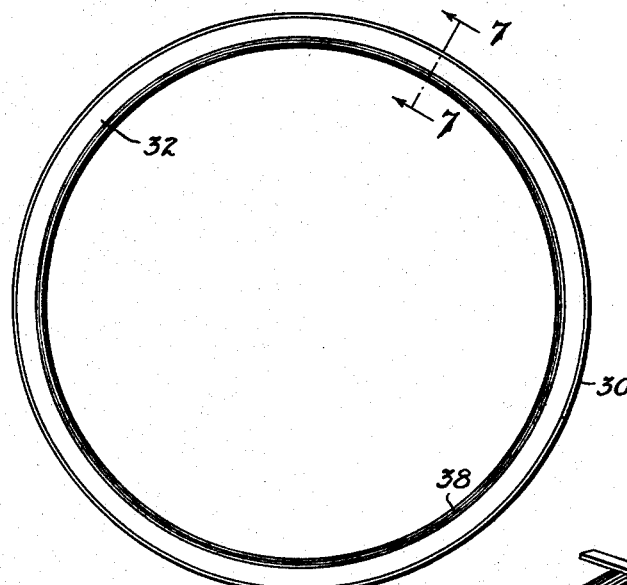
Fig. 6 is a side elevation of a tire of modified construction.

The bent ends of the tubing are inserted through the opening 23 of the wheel rim and the tire is stretched over the rim until it is properly seated, after which the bent ends of tubing and enclosed wire are twisted as shown in Figures 4 and 5 to tension the wire 18 and securely clamp the base 10 of the tire about the rim 22 so that the tire is securely held on the wheel.

The passageways 14, 15, and 16 provide enclosed circumferentially continuous cushioning spaces to lend additional resiliency to the tire body and provide for easy riding.

The crossing webs 13 which connect the radially outer peripheries of the side walls 11 with the base 10 provide a means for rendering the tire laterally stable and for absorbing side thrusts.

Since the passageways 14, 15, and 16 are closed a body of air is retained therein and the tire in operation on a wheel has the cushioned riding effect of a pneumatic tire inflated to low pressure and absorbs shocks and jars.

Also, the tread portion 12 is relatively thick as compared with the conventional pneumatic tire for bicycles and is more resistant to puncture.

The extruded body of rubber of the modified tire, shown in Figures 6 to 10, is very similar to that shown in Figure 2, and comprises tread, base and side wall portions 30, 31 and 32 respectively and intersecting stabilizing webs 33, which join with the side wall portions 32 adjacent the connections of the tread portion 30 therewith, and with the base portion 31 in the region of connection of the side wall portions with the base portion. The stabilizing webs 33 form, with the tread and base portions 30 and 31, cushioning passages 34 and 35 respectively, and with the side wall portions 32, cushioning passages 36.

Figure 7:
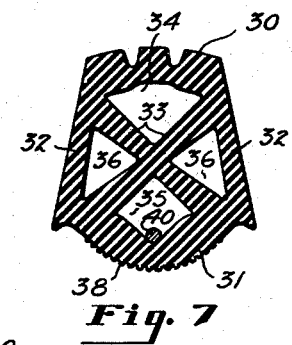
Fig. 7 is a transverse section taken on line 7—7 of Fig. 6.
Figure 8:
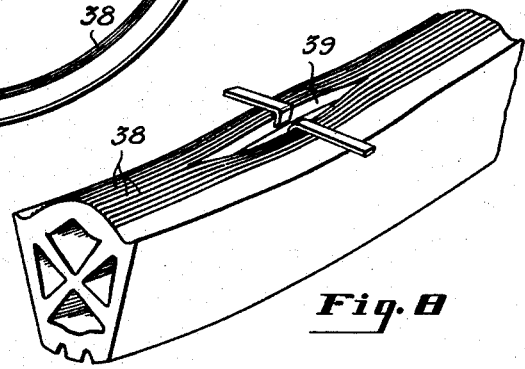
Fig. 8 is a fragmentary perspective view of the tire illustrated in Fig. 6, showing the same in condition to have an inextensible element inserted therein.
Figure 10:
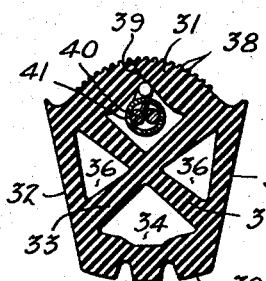
Fig. 10 is a transverse section taken on line 10—10 of Fig. 9.
Figure 9:
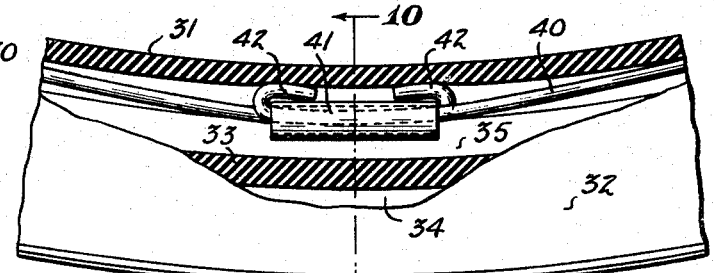
Fig. 9 is a fragmentary section showing the inextensible element in position.

If desired, the external face of the base portion 31 may be formed with a number of small longitudinally extruding ribs 38, as shown in Figs. 7 and 8, for a purpose to be later described.

In this construction, the extruded material is cut to length and arranged in circular form in a suitable vulcanizing heater with the ends in abutting relation and vulcanized, forming the same to the desired finished shape.

After vulcanization the base portion is slit, as shown at 39 in Fig. 8, and, while the sides of the slit are separated an inextensible wire 40 is threaded through the passage 35. The two ends of the wire are extended in overlapping relation through a sleeve 41 and after the wire is drawn taut, these ends are reversely bent over the ends of the sleeve 41, as shown at 42 in Fig. 9. After this, the sides of the slit are cemented together.

In order to assemble the tire just described to a wheel rim, the tire is forced over the rim, the resiliency of the base portion being sufficient to permit this to be done. If desired, the base portion may be cemented to the rim.

The crossed webs 33, like in the construction previously described, provide for lateral stability of the tire and yet permit flexing of the tire body to provide for a cushioned riding effect.

The tire of the present invention can be economically manufactured, is more resistant to puncture and is longer wearing and yet retains all of the riding qualities and advantages of a pneumatic tire.

Although a single embodiment of the invention has been herein shown and described, it will be understood that numerous details of the construction shown may be altered or omitted without departing from the spirit of this invention as defined in the following claims.

What I claim is:

1. A one-piece rubber tire comprising a continuous base, a continuous tread portion spaced therefrom, continuous side walls connecting the side edges of said base with the side edges of said tread portion, and a pair of stabilizing webs extending throughout the circumference of the tire and diagonally inwardly from the region of connection of said side walls with said tread portion and being joined with said base, said stabilizing ribs being spaced apart at said regions of connection of said side walls with said tread portion.

2. A one-piece rubber tire comprising a continuous base, a continuous tread portion spaced therefrom, continuous side walls connecting the side edges of said base with the side edges of said tread portion, and a pair of stabilizing webs extending throughout the circumference of the tire and diagonally inwardly from the region of connection of said side walls with said tread portion and being joined with said base, said stabilizing webs and tread portion defining the walls of a cushioning space underlying said tread portion.

3. A one-piece rubber tire comprising a continuous base, a continuous tread portion spaced therefrom, continuous side walls connecting the side edges of said base with the side edges of said tread portion, and a pair of stabilizing webs extending throughout the circumference of the tire and diagonally inwardly toward each other from the region of connection of said side walls with said tread portion and being joined with said base, said stabilizing webs and tread portion defining the walls of a cushioning space.

4. A one-piece rubber tire comprising a continuous base, a continuous tread portion spaced therefrom, continuous side walls connecting the side edges of said base with the side edges of said tread portion, and a pair of stabilizing webs extending throughout the circumference of the tire and diagonally inwardly from the region of connection of said side walls with said tread portion and being joined with said base, said base being of greater width than said tread portion, said stabilizing ribs being spaced apart at said regions of connection of said side walls with said tread portion.

5. A one-piece rubber tire comprising a continuous base, a continuous tread portion spaced therefrom, continuous side walls connecting the side edges of said base with the side edges of said tread portion, and a pair of stabilizing webs, each extending throughout the circumference of the tire and diagonally from a side wall and joining with said base adjacent the connection of the other side wall with said base, said webs intersecting and joining with each other between said base and tread portion, said webs forming separated cushioning spaces adjacent said base, said tread portion and each of said side walls.

6. A one-piece rubber tire comprising a continuous base having an aperture, a continuous tread portion spaced therefrom, continuous side walls connecting the side edges of said base with the side edges of said tread portion, a pair of stabilizing webs extending throughout the circumference of the tire and diagonally inwardly toward each other from the region of connection of said side walls with said tread portion and being joined with said base, and a non-extensible clamping band within said tire and adjacent the base thereof, said clamping band having end portions extending radially inwardly through and beyond the aperture in said base.

7. A one-piece rubber tire comprising a continuous base having an aperture, a continuous tread portion spaced therefrom, continuous side walls connecting the side edges of said base with the side edges of said tread portion, a pair of stabilizing webs extending throughout the circumference of the tire and diagonally inwardly toward each other from the region of connection of said side walls with said tread portion and being joined with said base, and a non-extensible clamping band within said tire and adjacent the base thereof, said clamping band having end portions extending radially inwardly through and beyond the aperture in said base, said end portions having tubular portions surrounding the same and extending into said tire.

8. A one-piece rubber tire comprising a continuous base, a continuous tread portion spaced therefrom, continuous side walls connecting the side edges of said base with the side edges of said tread portion, and a pair of stabilizing webs, each extending throughout the circumference of the tire and diagonally from a side wall and joining with said base adjacent the connection of the other side wall with said base, said webs intersecting and joining with each other between said base and tread portion, said webs forming separated cushioning spaces adjacent said base and said tread portion.

HERMAN T. KRAFT.